United States Patent
Frame et al.

(10) Patent No.: US 9,927,915 B2
(45) Date of Patent: Mar. 27, 2018

(54) OPTICAL NAVIGATION SYSTEMS AND METHODS FOR BACKGROUND LIGHT DETECTION AND AVOIDING FALSE DETECTION AND AUTO-MOVEMENT

(71) Applicant: Cypress Semiconductor Corporation, San Jose, CA (US)

(72) Inventors: John Frame, Arcadia, CA (US); Jing Mu, San Jose, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 14/858,217

(22) Filed: Sep. 18, 2015

(65) Prior Publication Data

US 2016/0117048 A1    Apr. 28, 2016

Related U.S. Application Data

(60) Provisional application No. 62/055,803, filed on Sep. 26, 2014.

(51) Int. Cl.

| G06F 3/041 | (2006.01) |
| G06F 3/042 | (2006.01) |
| G06F 3/044 | (2006.01) |
| G06F 3/0354 | (2013.01) |
| G06F 1/32 | (2006.01) |

(52) U.S. Cl.
CPC ......... *G06F 3/0418* (2013.01); *G06F 1/3231* (2013.01); *G06F 1/3262* (2013.01); *G06F 3/03547* (2013.01); *G06F 3/042* (2013.01); *G06F 3/044* (2013.01); *G06F 3/0421* (2013.01); *G06F 2203/04106* (2013.01); *Y02B 60/1289* (2013.01)

(58) Field of Classification Search
None
See application file for complete search history.

(56) References Cited

U.S. PATENT DOCUMENTS

| 5,994,710 A | * | 11/1999 | Knee | G06F 3/0317 |
| | | | | 250/208.1 |
| 7,317,448 B1 | * | 1/2008 | Sasselli | G06F 3/0317 |
| | | | | 345/163 |
| 7,486,386 B1 | | 2/2009 | Holcombe et al. | |
| 7,728,316 B2 | | 6/2010 | Fadell et al. | |
| 8,044,936 B2 | | 10/2011 | Kwak et al. | |
| 8,125,619 B2 | | 2/2012 | Chang et al. | |

(Continued)

OTHER PUBLICATIONS

Andrew Post, "Vishay Intertechnology Launches Fully Integrated Proximity and Ambient Light Sensor in Compact 4 mm by 2 mm by 1.1 mm Package", Vishay Intertechnology, accessed from http://www.reuters.com/article/pa-vishay-idUSnBw195913a+100+BSW20150219 , dated Feb. 19, 2015; 2 pages.

(Continued)

*Primary Examiner* — Ryan A Lubit (57) ABSTRACT

A method of operating an optical navigation system which includes disabling a light source to measure the ambient or external light level, comparing the measurement to a threshold level to determine whether the ambient light would cause false detection and light induced motion, and adjusting sensing parameter(s) to mitigate the effect of the ambient light.

20 Claims, 9 Drawing Sheets

(56) References Cited

U.S. PATENT DOCUMENTS

| | | | | |
|---|---|---|---|---|
| 8,400,409 | B1* | 3/2013 | Francis | G06F 3/0416 |
| | | | | 324/678 |
| 8,987,656 | B2 | 3/2015 | Hung et al. | |
| 2005/0051285 | A1 | 3/2005 | Yano et al. | |
| 2006/0131483 | A1* | 6/2006 | Schrey | G01S 7/4816 |
| | | | | 250/214 R |
| 2007/0279384 | A1 | 12/2007 | Brosnan | |
| 2007/0296699 | A1* | 12/2007 | Bohn | G06F 3/0317 |
| | | | | 345/166 |
| 2008/0240523 | A1 | 10/2008 | Benkley et al. | |
| 2009/0185162 | A1* | 7/2009 | Shakespeare | G01J 3/10 |
| | | | | 356/51 |
| 2011/0141020 | A1 | 6/2011 | Raynor | |
| 2011/0141487 | A1 | 6/2011 | Raynor | |
| 2013/0234978 | A1* | 9/2013 | Ksondzyk | G06F 3/044 |
| | | | | 345/174 |
| 2014/0079284 | A1* | 3/2014 | Kao | G06F 3/017 |
| | | | | 382/103 |
| 2014/0240721 | A1* | 8/2014 | Herschbach | G01S 17/003 |
| | | | | 356/625 |
| 2015/0144768 | A1* | 5/2015 | Lee | G06F 1/3259 |
| | | | | 250/208.1 |
| 2015/0193016 | A1* | 7/2015 | Chang | G06F 3/0354 |
| | | | | 345/158 |
| 2015/0353118 | A1* | 12/2015 | Entenmann | B62D 1/046 |
| | | | | 345/175 |

OTHER PUBLICATIONS

International Search Report for International Application No. PCT/US2015/051727 dated Jan. 6, 2016; 2 pages.

Silicon Labs, "Silicon Labs Solutions for Active Infrared Proximity Sensing"; 35 pages.

Written Opinion of the International Searching Authority for International Application No. PCT/US2015/051727 dated Jan. 6, 2016; 7 pages.

* cited by examiner

OPTICAL NAVIGATION SYSTEMS AND METHODS FOR BACKGROUND LIGHT DETECTION AND AVOIDING FALSE DETECTION AND AUTO-MOVEMENT

PRIORITY

The present application claims the priority and benefit under 35 U.S.C. § 119(e) of U.S. Provisional Application No. 62/055,803, filed on Sep. 26, 2014, which is incorporated by reference herein in its entirety.

TECHNICAL FIELD

The present disclosure relates generally to the field of optical navigation systems, and more particularly to optical finger navigation systems and methods of operation therefor to distinguish external background light for improved navigation surface detection and motion tracking.

BACKGROUND

Optical finger navigation (OFN) modules or systems make use of optical physics to measure the degree of the relative motion, in both speed and magnitude, between a navigation device and the navigation/tracking surface. These OFN systems find their major application in pointing and finger tracking devices and are becoming increasingly common in data processing systems, such as cellular telephones, tablet computers, electronic readers, control pad/console in automobiles and portable entertainment or game systems for data input and/or cursor movement. OFN systems in general include optical navigation sensors (ONS), which generally include a light source to illuminate a tracking surface, such as a finger or stylus in contact with a surface of the OFN system, and an optical sensor, such as a charge-coupled device (CCD), complementary metal-oxide-semiconductor (CMOS) imaging array, or a photo-diode array, or a photo-detector array, to capture an image or signal in light reflected and/or scattered from the tracking surface. A tracking program implemented in a single or multiple processor(s) coupled to the sensor analyzes successive images or signals to determine displacement of the OFN system relative to the tracking surface.

One of the problems with existing OFN systems is that the ONS, in particular the optical sensors, may not differentiate between light reflected or scattered off a finger or stylus and environmental or ambient light. Strong and variable ambient light can cause spurious detected motions known as auto-movements or light-induced motion. Sunlight is a particular problem especially for OFN systems installed in vehicles, and manufacturers usually require that the OFN systems pass strict sunlight tests with specified range of light intensity conditions, test time, test angle, and orientations relative to sunlight.

BRIEF DESCRIPTION OF THE DRAWINGS

The present disclosure is illustrated by way of example, and not by way of limitation, in the FIGS. of the accompanying drawings.

DETAILED DESCRIPTION

The following description sets forth numerous specific details such as examples of specific systems, components, methods, and so forth, in order to provide a good understanding of several embodiments of the subject matter. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the embodiments.

Embodiments of the optical finger navigation (OFN) system and optical navigation sensor (ONS), and methods of operating the same to at least mitigate incidents of false surface detection and inaccurate tracking of movement due to the presence of background light will now be described with reference to the accompanying drawings. The drawings described are only schematic and are non-limiting. In the drawings, the size of some of the elements may be exaggerated and not drawn to scale for illustrative purposes. The dimensions and the relative dimensions may not correspond to actual reductions to practice of the embodiments. For purposes of clarity, many details of input devices and methods of operation in general, and optical navigation sensors (ONS) and optical finger navigation (OFN) systems in particular, which are widely known and not relevant to the present apparatus and method have been omitted from the following description.

SUMMARY

According to one embodiment, a method of operating an ONS includes the steps of disabling and enabling a light source in an optical navigation sensor (ONS) periodically, sampling, from an optical detector of the ONS, a first plurality of signals during a first time period and a second plurality of signals during a second time period, comparing at least one of the first plurality of signals to a threshold value, and if the at least one of the first plurality of signals is greater than the threshold value, suppressing reporting of the second plurality of signals to avoid false detection and auto-movement in an output of the ONS. Details of the embodiment and other embodiments will be explained in the following paragraphs.

Figure 1:
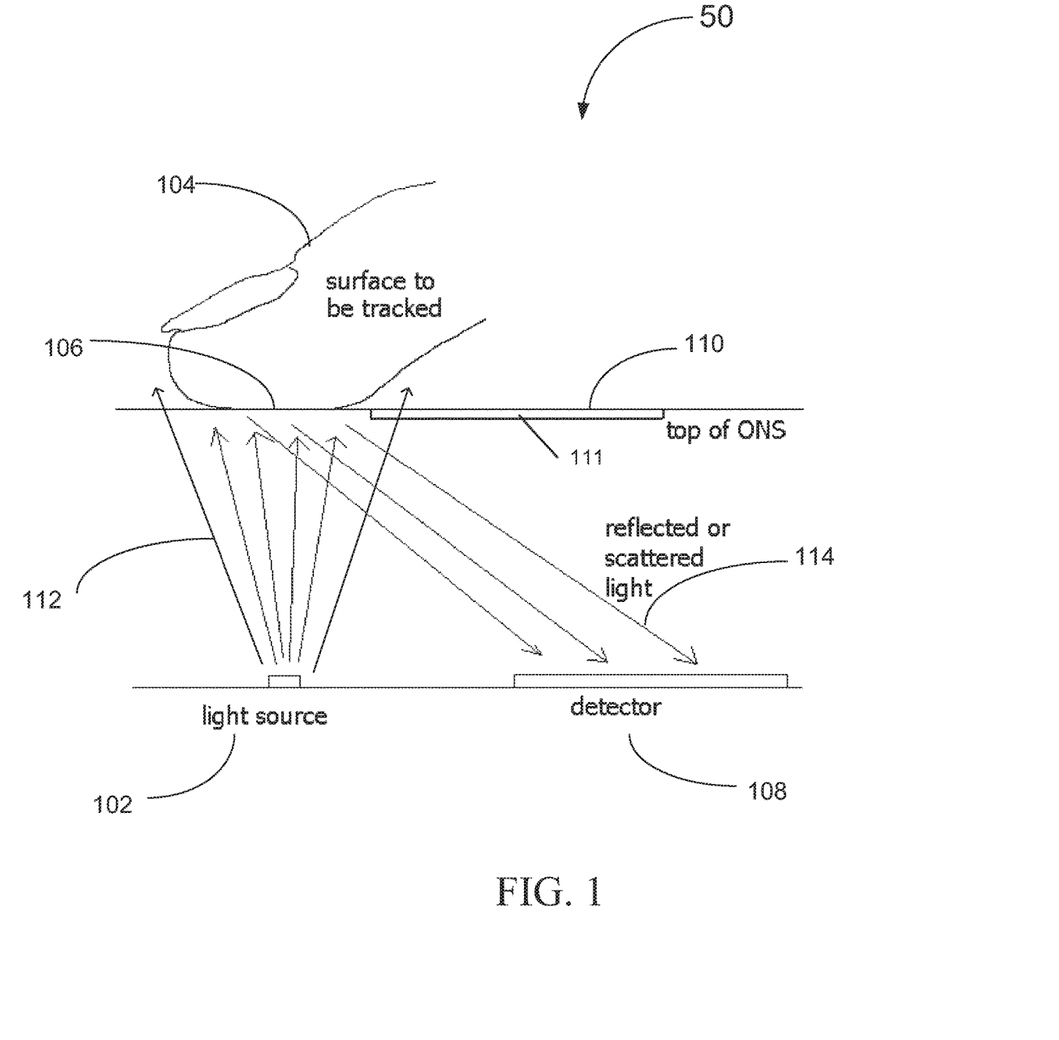
FIG. 1 is a representative diagram illustrating a schematic view of a portion of an optical finger navigation (OFN) system associated with a method for sensing a tracking surface.

FIG. 1 is a representative view of a portion of an optical finger navigation (OFN) system 50 associated with a method for sensing a tracking surface. In one embodiment, optical navigation sensor (ONS) includes light source 102 and detector 108 to detect the presence and/or track motion of a tracking surface 106, typically user's finger 104 or a stylus. As shown in FIG. 1, an upward-facing light source 102, which may be controlled by processing element(s) such as a microcontroller, a processor or a sensor (not shown), directs light beams 112 upwardly and towards top panel 110. In one embodiment, common light sources include but not limited to light emitting diodes (LED) and lasers such as infrared lasers. Laser sources have the advantage of high resolution and can be used on a wide variety of surfaces, including ones that are only moderately reflective. Although LEDs may be more susceptible to external vibrations and ambient light noise, they offer an ease of implementation in applications where high resolution may not be essential and also not required to meet any eye safety standards. In one embodiment, top panel 110 is made of durable materials which are optically transparent to the wavelength of electromagnetic radiation from light source 102 and background light source 52, such as but not limited to glass or poly(methyl methacrylate) (PMMA). In some embodiments, top panel 110 is the top panel of housing or an enclosure (not shown) for OFN system 50. As shown in FIG. 1, when tracking surface 106 is placed in close contact with and onto top panel 110, a portion of light beams 112 illuminates tracking surface 106. In one embodiment, a part of light beams 112 is absorbed, and some of it gets scattered and reflected off as reflected/scattered light 114. In one embodiment, the degree or the percentage of light absorption, reflection, and scattering depends on both the wavelength of light beams 112 and the characteristics of tracking surface 106. The portion of light beams 112 that gets absorbed and escapes through top panel 110 is practically lost, while reflected/scattered light 114 can be gathered, captured and processed in order to extract certain amount of useful information, such as presence and movement of tracking surface 106 relative to OFN system 50.

Referring to FIG. 1, a portion of light scattered or reflected 114 off tracking surface 106 is incident upon optical detector 108. In one embodiment, irrespective of light source 102 type (lasers such as vertical-cavity surface-emitting lasers (VCSEL), or LED or others) used, a photodiode array and/or CMOS imaging array and/or other photosensors that are known in the art is a fundamental part of any optical sensor or detector 108. As shown in FIG. 1, in one embodiment, optical detector 108 is facing upward to receive reflected/scattered light 114. As practiced by one having ordinary skill in the art, the dimensions, type, arrangement and orientation of optical detector 108 depend on detection and processing technique adopted and usually varies from ONS to ONS. In one embodiment, each optical detector 108 consists of several small scaled photodiodes (pixels) which define the resolution and in general, more pixels provide a higher resolution of sensed/captured images. In one embodiment, optical detector 108 may be configured based on either the reflection based method, the scattering based method, or a combination thereof, or other detection techniques that are known in the art. When reflected/scattered light 114 is incident on optical detector 108, optical detector 108 may capture reflected/scattered light 114 in the form of images of tracking surface 106. In one embodiment, optical detector 108 may generate electrical signals based on the intensity or irradiance of images captured of reflected/scattered light 114. In one embodiment, depending on the technology used, optical detector 108 may also sample the shape, image, or other properties of reflected/scattered light 114. In one embodiment, additionally or alternatively, depending on the detection and processing technologies, optical detector 108 may generate electrical signals based on other properties, such as wavelength, spatial frequency/phase, shape of captured images based on reflected/scattered light 114. An image captured from reflected/scattered light 114 may contain different spatial frequencies, which are generated based on the microscopic textural of tracking surface 106 or a signature of tracking surface 106. In one embodiment, irrespective of the detection methods, the generated signals are processed using image correlation processing to determine x/y-axis motion of tracking surface 106 relative to optical detector 108. In another embodiment, the generated signals are processed using phase/spatial frequency processing wherein any change in the phase/spatial frequency implies that tracking surface 106 may be moving relatively to optical detector 108 or have changed their relative positions. The amount of phase/frequency shift gives information about the direction and magnitude of motion. In one embodiment, irrespective of the detection and processing methods and technologies, reflected/scattered light 114 incident on optical detector 108 is sampled over a period of time in a predetermined timing sequence. Any change in reflected/scattered light 114 from one sample to the next sample is used to determine presence and/or motion of tracking surface 106. In one embodiment, sampling data may be processed by a microcontroller(s), processor(s) (not shown), and/or output/report to another device via a suitable communication protocol (not shown) to determine presence and motion of tracking surface 106.

Figure 2:
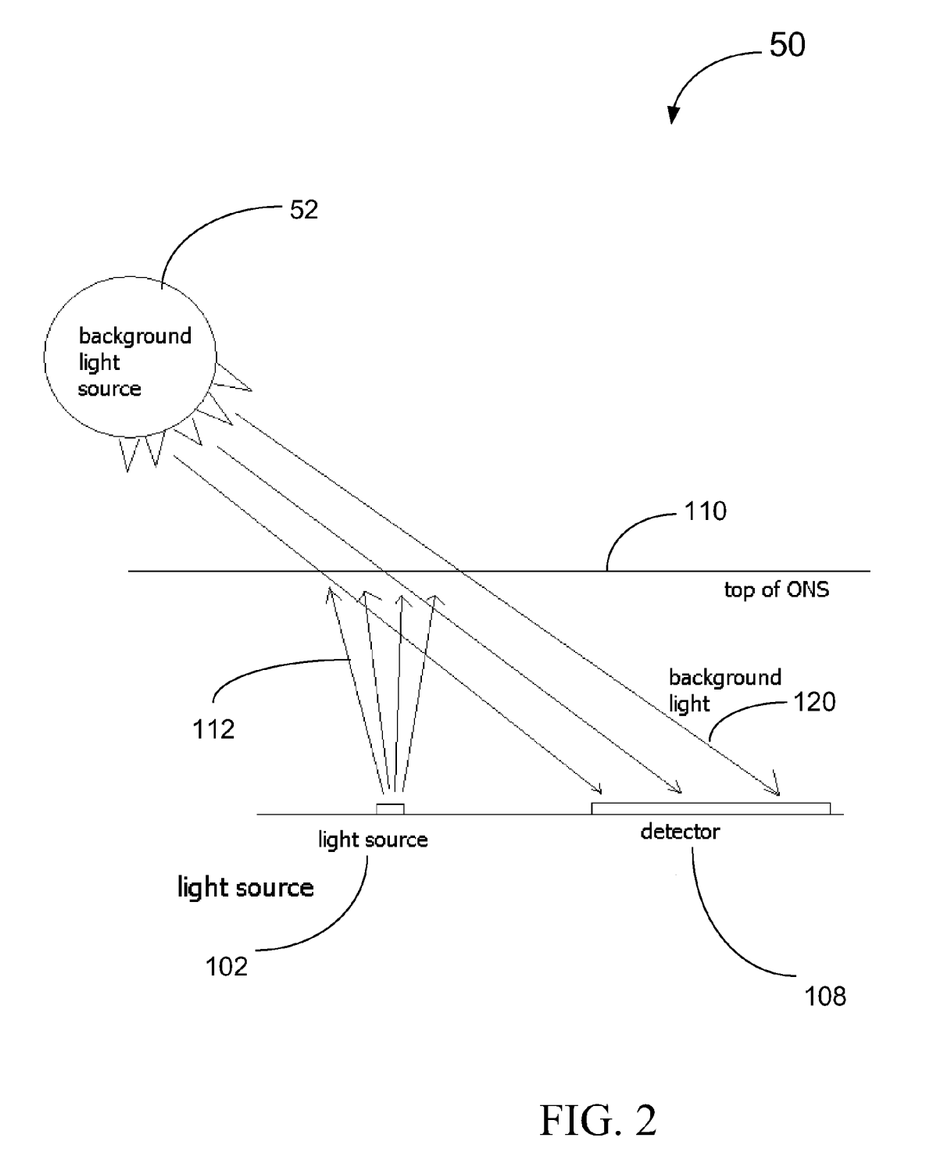
FIG. 2 is a representative diagram illustrating a schematic view of a portion of an OFN system in the presence of background light.

FIG. 2 is a representative view of a portion of an optical finger navigation (OFN) system 50 showing the effect of background light source 52 when tracking surface 106 is absent. As illustrated in FIG. 2, background/external light source 52 provides background/external light 120, such as sunlight and in general light coming from the outside of the OFN system. In one embodiment, irrespective of operation status of light source 102 and presence of tracking surface 106, background light 120 may be incident on optical detector 108 through the transparent top panel 110 with certain intensity and/or image. In one embodiment, since optical detector 108 may not be able to distinguish background light 120 from reflected/scattered light 114 based on images captured, it may generate and report sampling data which falsely indicates presence of tracking surface 106. Moreover, if background light 120' is changing or moving, then OFN system 50 may also incorrectly detect and report motion of tracking surface 106. Both of these potential failures—false surface detection and light-induced motion are observed, and limit the usefulness of ONS in environments that have strong background light 120.

Figure 3:
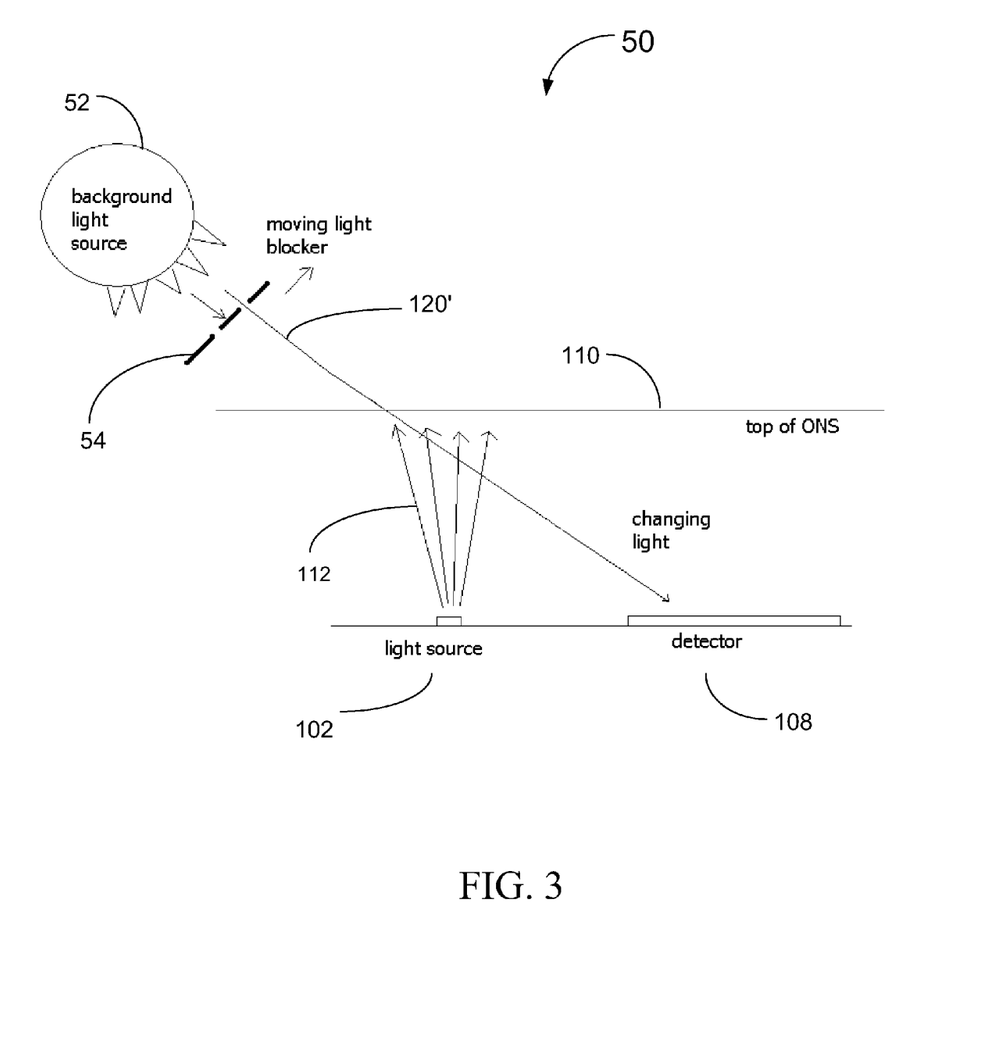
FIG. 3 is a representative diagram illustrating a schematic view of a portion of an optical finger navigation (OFN) system in the presence of background light and a moving light blocker.

FIG. 3 is a representative view of a portion of OFN system 50 showing the effect of potentially moving background light source 52. As illustrated in FIG. 3, irrespective of background light source 52 being natural, such as sunlight, or artificial, background light 120' may change and/or move over time. In one embodiment, the change may manifest in intensity, wavelength, frequency, incident angle, shape, movement, spatial frequency/phase and combinations thereof. One possible cause of such change is when a fixed light source 52 is blocked by moving light blocker 54 that blocks background light 120' at least partially in a dynamic manner between background light source 52 and optical detector 108, as illustrated in FIG. 3. In one embodiment, even in the case of light source 102 being on, most light beam 112 may escape OFN system 50 through transparent top panel 110 and there may be insignificant reflected/scattered light 114 incident on optical detector 108. In an embodiment of an application, OFN system 50 may be a part of a control console or an input system inside a moving vehicle. The background sunlight 120' that is incident on optical detector 108 is being intermittently or periodically blocked by a row of trees or buildings. In one embodiment, as a result, optical detector 108 may detect a dynamically changing light pattern both in terms of intensity and image in response to moving background light 120'. Depending on the sensing and/or processing technology of ONS, the changing light pattern may be interpreted as motion of tracking surface 106 which may be false, or at least not accurate. Consequently, ONS of OFN system 50 may erroneously report presence and/or motion of tracking surface 106 which may not be present.

Figure 4:
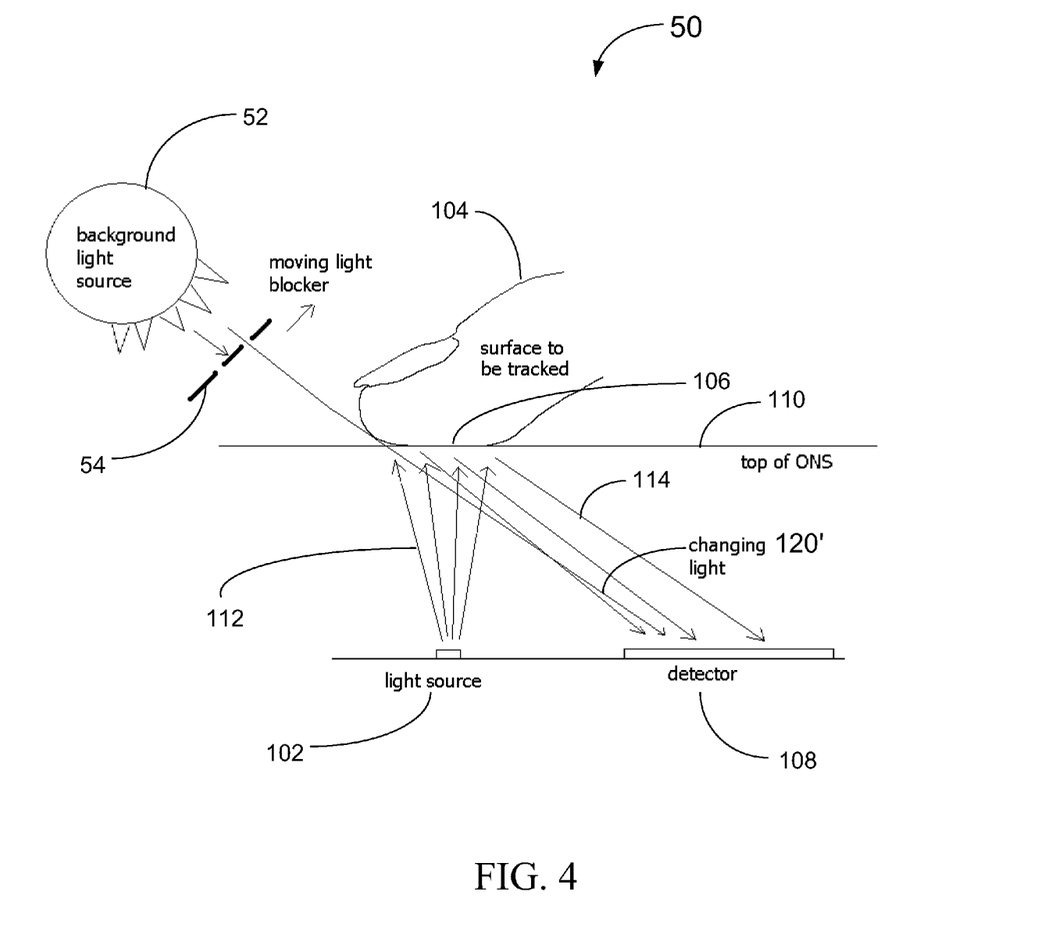
FIG. 4 is a representative diagram illustrating a schematic view of a portion of an optical finger navigation (OFN) system associated with a method for sensing a tracking surface in the presence of background light and a moving light blocker.

FIG. 4 is a representative view of a portion of OFN system 50 showing the effect of potentially changing/moving background light source 52 when tracking surface 106 is present. As illustrated in FIG. 4, dynamic background light 120' is present along with tracking surface 106, which presence and movement is to be sensed and reported. In one embodiment, while some moving background light 102' may be blocked by tracking subject such as a finger 104, a portion of moving background light 102' may still leak around tracking subject 104 and is incident on optical detector 108, as previously described in FIG. 3. As illustrated in FIG. 4, since light source 102 is switched on/enabled in the presence of tracking surface 106, there is significant amount of reflected/scattered light 114 incident on optical detector 108 simultaneously. Consequently, light incident on optical detector 108 is a combination of the valid/desired reflected/scattered light 114 responding to presence/movement of tracking surface 106 and the invalid/undesired moving background light 120'. In one embodiment, depending on the sensing technology of optical detector 108 and the relative intensity of moving background light 120', the detected presence/motion data of tracking surface 106 may be corrupted. Accordingly, ONS may properly report presence of tracking surface 106, but may incorrectly or inaccurately report movement of tracking surface 106.

In one embodiment, the false surface detection and light-induced motion reporting may be mitigated by incorporating light-blocking baffles (not shown) to OFN system SO, in an attempt to block background light 120, so that only light (preferably reflected from a tracking surface) from a particular angle or location would propagate upon optical detector 108. However, baffles may not completely block background light 120 because a portion of background light 120 may still be able to leak around tracking surface 106 or blocking baffles and inevitably transmitted through top panel 110 of OFN system 50. Also, if tracking surface 106 is not present, background light 120 may pass through without being blocked. In one alternative embodiment, static and dynamic data about the detected light is collected, and is subsequently compared to signatures that tend to be correlated with captured images of background light 120. However, in certain embodiments, only limited data static and dynamic data is available from optical detector 108 or sensor circuit, and the determination of background light 120 vs. desired reflected/scattered light 114 may be only partially effective. Occasionally background light 120 may be treated as desired reflected/scattered light 114, and vice-versa. Also the data collection and processing may take too much time and result in latency in reporting data to OFN system's SO users. In yet another embodiment, a capacitive sensing element 111 may be incorporated around or close or adjacent to OFN system 50, and use a capacitive sense detector to initiate surface tracking only if the capacitive sense detector has determined presence of a tracking surface 106, such as a finger. The capacitive sensing incorporated embodiment may require additional mechanical structure for capacitive sensing, complicates industrial design and increases cost. It may fail when tracking surface 106 is only in contact of the capacitive sense element but does not cover an effective optical tracking area of OFN system 50.

Figure 5:
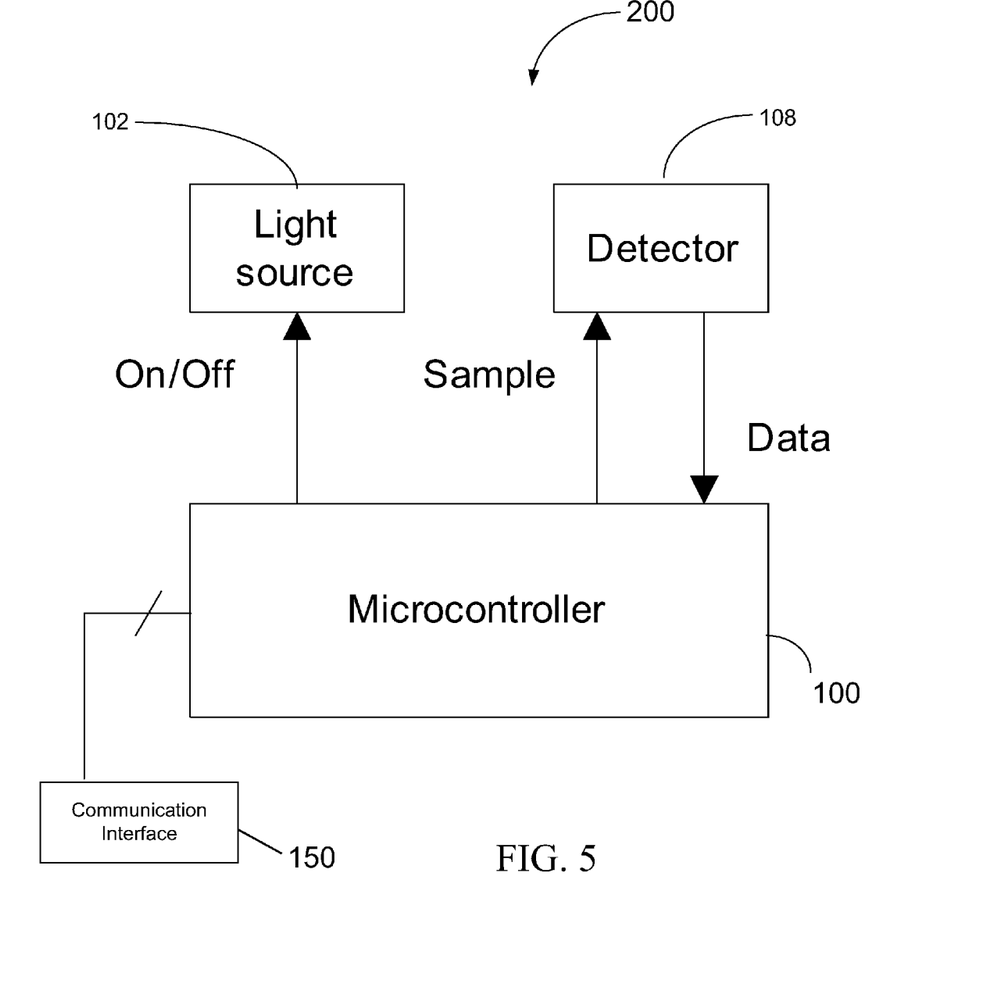
FIG. 5 is a representative block diagram of an OFN system associated with the embodiments shown in FIGS. 1 to 4.

FIG. 5 illustrates a schematic block diagram showing a portion of OFN system 50 according to one embodiment of the subject matter. In one embodiment, the static and dynamic characteristics of reflected/scattered light 114 are typically collected and used by OFN system 50 to report two things: (1) The presence or absence of tracking surface 106, and (2) the distance that the tracking surface 106 has moved relative to the OFN system 50. In one embodiment, OFN system 50 includes light source 102, such as, but not limited to, an LED or a laser diode such as VCSEL diode, optical detector 108, microcontroller 100 and communication interface 150, such as, but not limited to, a serial peripheral interface (SPI), an inter-integrated circuit (I²C), a universal serial bus (USB), may be mounted on a substrate or printed circuit board. In one embodiment, OFN system 50 may be an integrated or embedded system such as a System on Chip (SoC) implementation. The SoC implementation enables multiple resources on a single chip, some of these resources can be firmware implementations only, while others can be available as application-specific integrated circuits (ASICs) within the chip, or combinations thereof. The SoC implementation may reduce the burden of integration and the required board space and hence the manufacturing cost. In another embodiment, OFN system 50 is not an embedded system, includes one or more ICs or discrete components packaged within a common multi-chip module (MCM) or package, or can be separately mounted to a printed circuit board.

In one embodiment, microcontroller 100 may perform tasks of a digital signal processor (DSP) as it receives sampled optical data signal from optical detector 108 in the form of a matrix and performs data analysis. Microcontroller 100 is a processing element or a combination of multiple processing elements that may include multiple processor(s) and storage elements, such as RAM, EEPROM, ROM, etc., with firmware and/or software embodied on for operating OFN system 50 and other related circuits/modules. Different OFN systems may use different processing techniques, such as the above-mentioned image correlation processing or phase/spatial frequency processing, depending upon the system's requirements. In one embodiment, OFN system 50 is usually a part of a higher level system, and needs to communicate with other functional blocks of said system. As illustrated in FIG. 5, OFN system 50 requires support for communication interface 150. For instance, OFN system 50 may be a part of a control console of a vehicle that needs to communicate with a higher level control system, which in turn controls other functions, such as A/C system, car window control system, etc., of the vehicle. Referring to FIG. 5, microcontroller 100 may include front-end circuitry for coupling signals out from optical detector 108, signal processing and interface circuitry for translating changes in light pattern of reflected/scattered light 114 and/or background light 120 propagated onto optical detector 108 into motion data, and a programmable controller to control operation of light source 102 and optical detector 108.

In one embodiment, microcontroller 100 includes a programmable switching function module which disables light source 102 (light-off or reduced period) so that data sampled/retrieved from optical detector 108 during the light-off period corresponds to background light 120 mainly, if not exclusively. In one embodiment, the switching function may be implemented in hardware, such as switching off or reduce the power to the light source 102 with a transmission gate or a switch, software, such as reprogramming the output level of light source 102, or mechanical, such as a movable physical light barrier blocking the output of light source 102, or combinations thereof. In one embodiment, enabling and disabling light source 102 may mean switching it on and off completely. In another embodiment, enabling and disabling light source 102 may include maintaining output level of light source 102 at a high and low level, respectively. Irrespective of the switching function module type, light source 102 may be either switched off completely, or reduced in intensity to a predetermined level for the aforementioned purposes. In one embodiment, light source 102 switching function module is synchronized to the operation timing of optical detector 108 by configuring the sampling frequency of optical data. Consequently, microcontroller 100 may sample data from optical detector 108 while light source 102 is disabled. In one embodiment, the synchronization between switching function and sampling function may be implemented by microcontroller 100 with firmware that controls light source 102 and optical detector 108, respectively.

In one embodiment, for tracking surface 106 detection, light source 102 is briefly disabled according to a synchronized time schedule controlled by microcontroller 100. While light source 102 is disabled, microcontroller 100 may sample data from optical detector 108, also according to the synchronized schedule. The sampled light-off data is further processed, analyzed, and stored in microcontroller 100. At the completion of the light-off data sampling interval, light source 102 is enabled (light-on period), and light-on data may be sampled and subsequently coupled to microcontroller 100. The sampled light-off data is then compared to threshold value(s) to determine if background light is present, or at least reaches a level that it may compromise the light-on data. If the sampled light-off data exceeds or equals to or is within a close range of the threshold value, then a background light situation is determined, and microcontroller 100 is programmed not to report tracking surface 106 presence regardless of the value of the sampled light-on data. In one embodiment, sampled data may correspond to, depending on the detection and processing technologies adopted, image captured of reflected/scattered light 114 and/or background light 120 incident on optical detector 108. In one embodiment, threshold value(s) may be predetermined and stored at microcontroller 100, or programmable by a higher level system (not shown), or adaptable to operational sensing parameters.

In one embodiment, for motion reporting of tracking surface 106, light source 102 is also briefly disabled while light-off data is being sampled according to a same synchronized schedule controlled by microcontroller 100. Similar to the presence detection, light-off data sampling is interspersed with light-on data sampling whereas light source 102 is enabled by microcontroller 100. In one embodiment, if the sampled light-off data exceeds the threshold value, microcontroller 100 does not report either motion or presence of tracking surface 106 irrespective of the value of the sampled light-on data.

Figure 6:
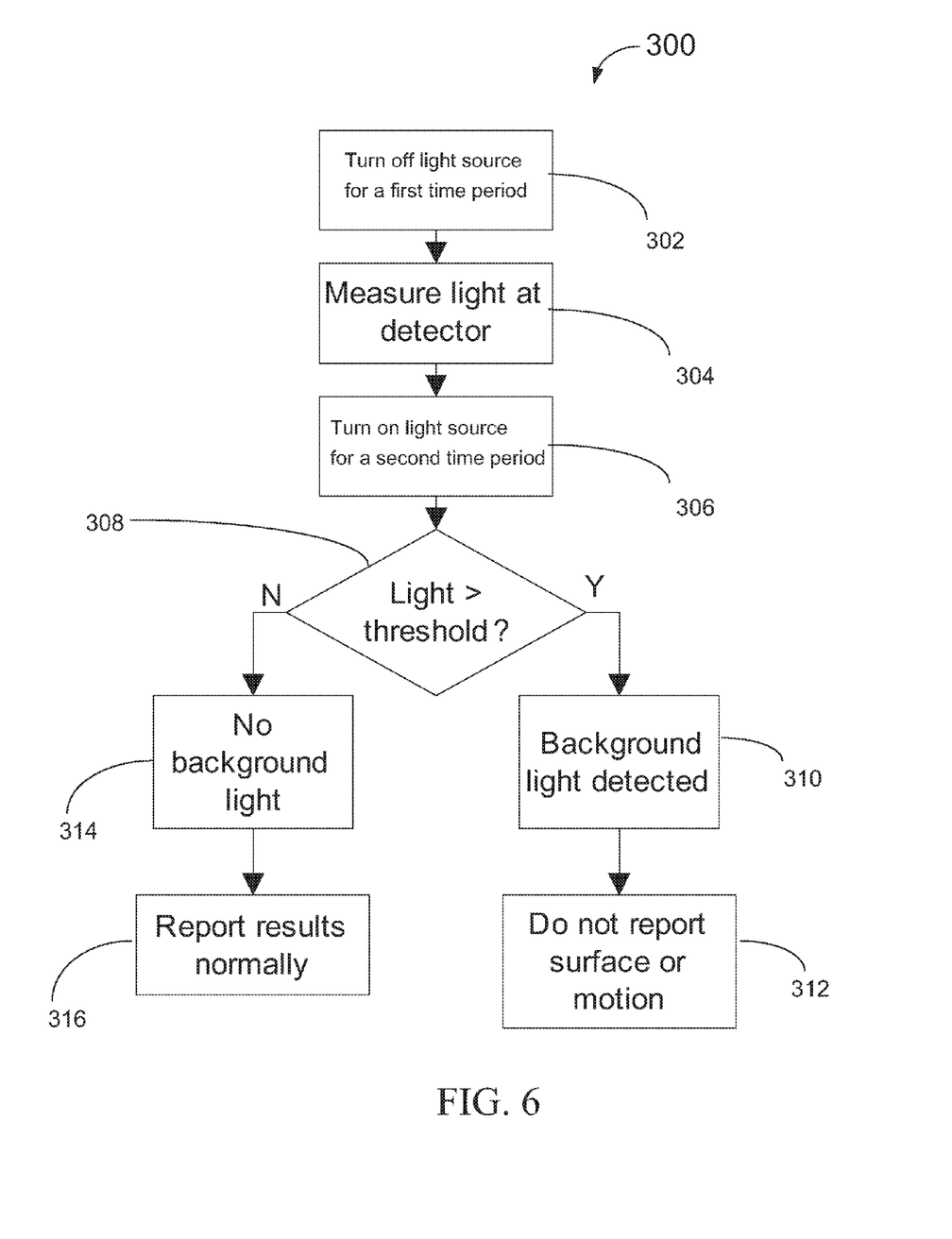
FIGS. 6 to 8 are flowcharts illustrating embodiments of a method for sensing a tracking surface with an OFN system associated with the embodiments shown in FIGS. 1 to 4.
Figure 7:
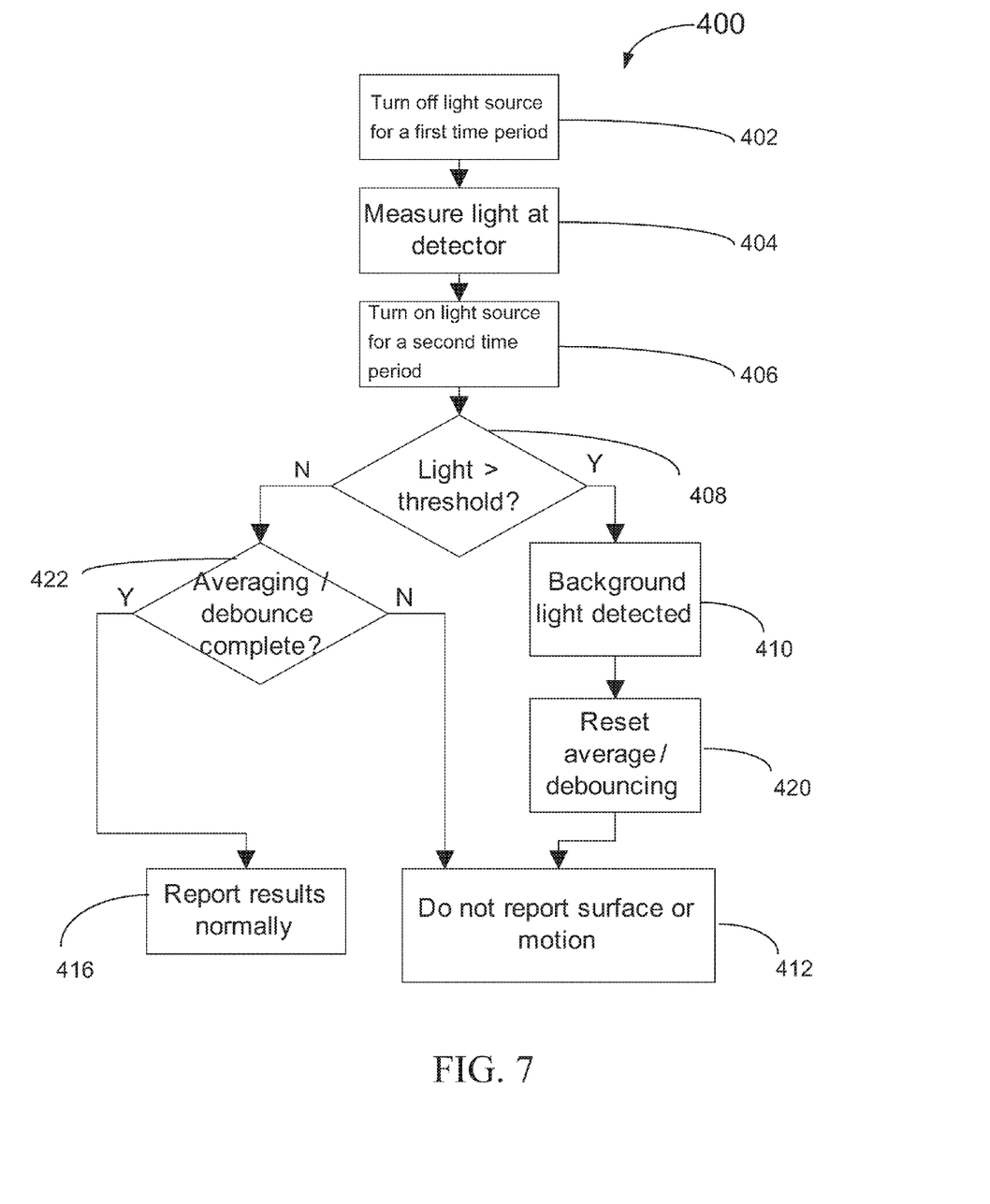
Figure 8:
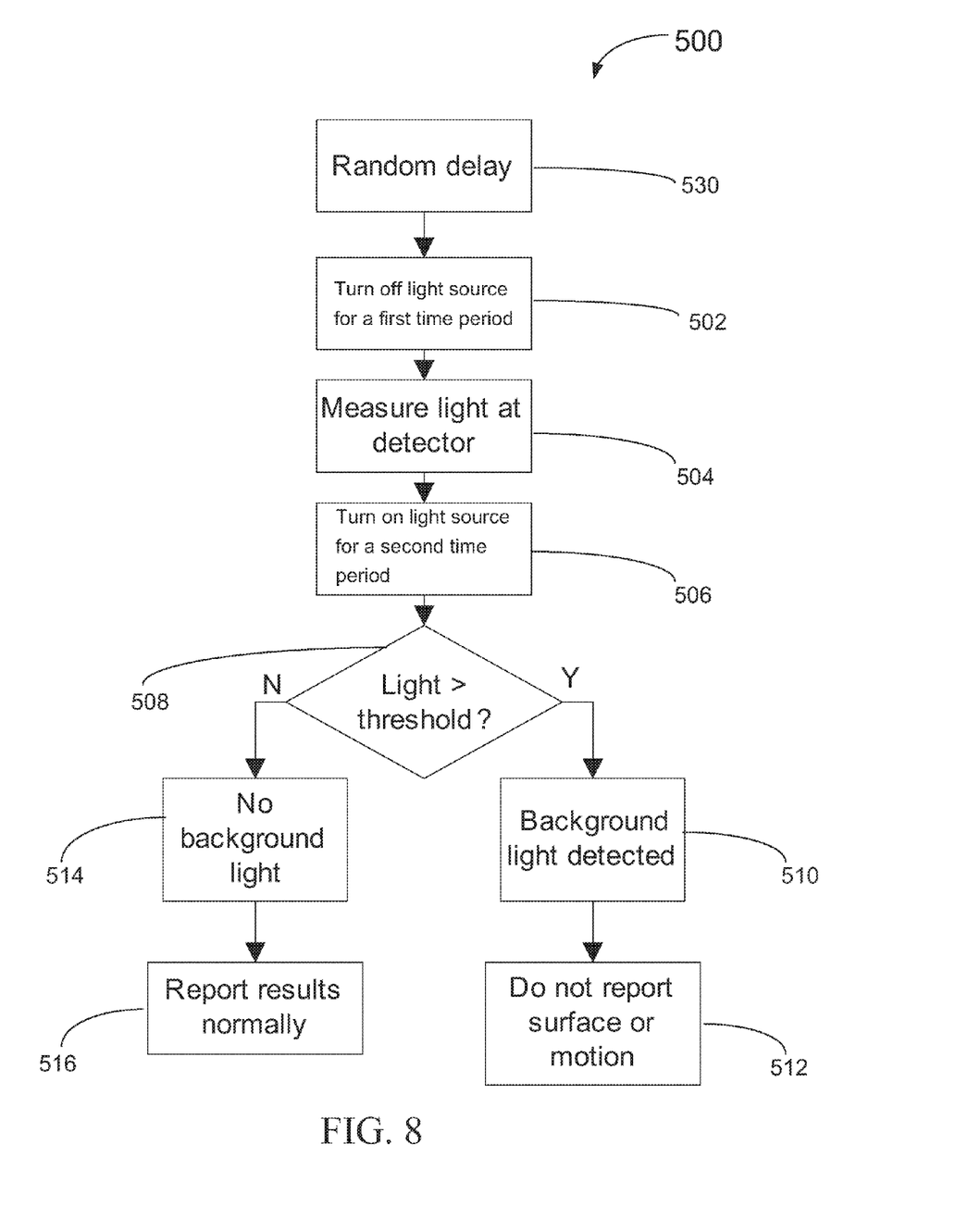

FIGS. 6 to 8 are flowcharts illustrating embodiments of a method for sensing and reporting tracking surface 106 with OFN system 50 associated with the embodiments shown in FIGS. 1 to 4. In one embodiment, OFN system 50 may adopt the method for tracking surface 106 detection only, or for tracking surface 106 motion reporting only, or adopt the method for both. Alternatively, OFN system 50 may be configured to sense and determine only presence of background light 120 without mitigation action. In one embodiment, the presence of background light 120 is reported but no steps may be taken to mitigate the potential effects.

Referring to FIG. 6 and as previously described, light source 102 is first disabled in step 302, hence only background light 120 (if present) incident upon optical detector 108 (light-off data) is sensed, sampled, measured and processed in microcontroller 100 in step 304. Then, light source 102 is enabled and light-on data is sampled in step 306. In step 308, data sampled during the light-off period is compared to a threshold value or values. If the light-off data exceeds the threshold value(s), the subsequently sampled light-on data will not be reported as it is determined, by the microcontroller 100 or outside systems (not shown), that background light is present. Otherwise, microcontroller 100 will report data sampled during light-on period to determine if tracking surface 106 is present and/or moving. In one embodiment, OFN system 50 is configured to sample light-off data with the purpose of suppressing false surface detection and false motion reporting due to background light 120. However, in the event that background light 120 is determined absent, there may be missing motion data during the light-off period as optical detector 108 may fail to sense any reflected/scattered light 114, resulting in missing tracking surface 106 motion data. In one embodiment, microcontroller 100 may be configured to artificially substitute lost motion data by interpolating between the sampled light-on data occurring before and after the light-off period. In another embodiment, microcontroller 100 may adopt other methods of estimating the amount of lost motion, such as considering the duration of light-off period. Other estimation techniques, such as interpolation and averaging may be used, along with calculated estimates of tracking surface 106 motion data and acceleration of said motion.

In one embodiment, light-on and light-off data is sampled in separate time periods, according to the switching schedule of light source 102 and sampling schedule of optical detector 108. When OFN system 50 is subjected to changing background light 120' conditions, such as the embodiment illustrated in FIG. 3, there may be occasions that sampled light-off data only dips below the threshold value because background light 120' is blocked coincidentally during at least a portion of the light-off sampling period. The background light 120' may then be unblocked during the light-on period and compromise the sampled light-on data. As a result, microcontroller 100 may mistakenly conclude absence of background light 120' and report the compromised light-on data samples that may lead to light-induced motion detection. Referring to FIG. 7, additional averaging and debouncing steps 420 and 422 are incorporated to mitigate such false reporting of presence/motion data due to moving/changing background light 120'. In step 408, if background light 120' is concluded absent during the light-off sampling period but returns during light-on sampling period, microcontroller 100 may fail to determine the presence of background light 120'. To prevent this, the microcontroller 100 may be configured to debounce the sampled light-off signal data before making a final determination regarding the presence of background light 120'. In one embodiment, in step 422, microcontroller 100 may sample data from optical detector 108 for a pre-determined number of times, either during a single light-off period or multiple light-off periods. Microcontroller 100 is configured to compare multiple light-off data samples to the threshold value(s) in order to determine that there truly is no background light 120' before reporting the sampled light-on data. Alternatively, microcontroller 100 may generate an average value of multiple sampled light-off data over a pre-determined averaging period, compare the average value to a predetermined value and only determine a no background light 120' condition if the average light value is below the predetermined value, such as the threshold value. Regardless of the approach, once the final determination is made, microcontroller 100 will report or not report the sampled light-on data as previously described in FIG. 6. In one embodiment, the average value and debouncing step are reset in step 420 after the final determination is made.

In certain embodiments, background light 120' may move or change periodically, at least for a duration of time. Coincidentally, in one embodiment, the periodicity of change of background light 120' may be at least temporarily synchronous with the on-off operation schedule of light source 102. As a result, for example, background light 120' may be blocked every time when light source 102 is disabled. In those cases, using the debouncing and averaging approach as described in steps 420 and 422 may not mitigate a false final determination of background light 120' presence because microcontroller 100 may repeatedly sample optical detector 108 when background light 120' is blocked while light source 102 is disabled. As such, debouncing or taking an average of multiple light-off data may not help mitigate the potential sensing errors. In one embodiment, to prevent such false decisions, the periodicity of optical detector 108 sampling may be jittered. For example, instead of operating at a fixed timing schedule, the light-off data sampling may occur at random or pseudo-random intervals and/or for random durations. Alternatively or additionally, referring to FIG. 8, a random delay as in step 530 may be incorporated before the light-off data sampling (steps 502 and 504) such that the periodic moving/changing background light 120' may be out of phase with the light-off data sampling timing.

Figure 9:
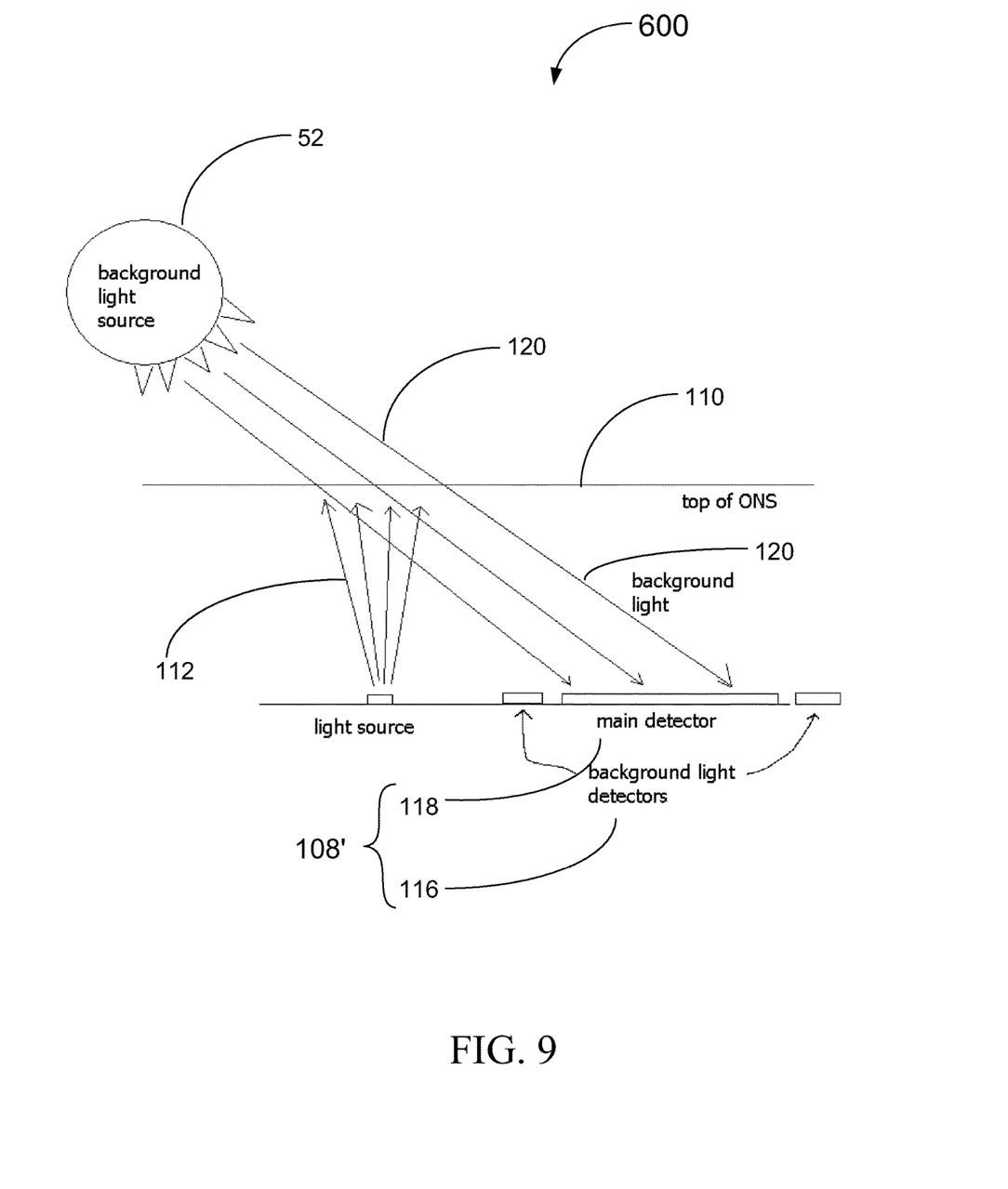
FIG. 9 is a representative diagram illustrating a schematic view of a portion of an alternative embodiment of an OFN system associated with a method for sensing a tracking surface.

Referring to FIG. 9, in one embodiment, instead of having a single optical detector 108 for sensing both reflected/scattered light 114 and background light 120, background light detector 116 which is dedicated to detecting background light 120 may be incorporated to OFN system 600. In one embodiment, optical data from background light detector 116 is only sampled when light source 102 is disabled/switched off.

In one embodiment, the concept of optical sensing during a switching-off period of light (EM radiation) source may be adapted to infrared proximity detection modules, such as the modules used in cellular phones or tablets. It may also improve performance of infrared proximity sensors by reducing occurrence of false detection.

Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

In the foregoing specification, embodiments of the subject matter have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A method, comprising:
disabling and enabling, using at least one processing element, a light source in an optical navigation sensor (ONS) periodically;
using the at least one processing element, receiving a first plurality of signals from sampling by an optical detector of the ONS during a first time corresponding to the light source being disabled, wherein a periodicity of the sampling by the optical detector is jittered;
receiving, using the at least one processing element, from the optical detector a second plurality of signals during a second time corresponding to the light source being enabled;
comparing at least one of the first plurality of signals to a threshold value; and
in response to the at least one of the first plurality of signals being greater than the threshold value, suppressing, using the at least one processing element, reporting of the second plurality of signals to avoid false detection and auto-movement in an output of the ONS.

2. The method of claim 1, wherein the first plurality of signals corresponds to external light to the ONS propagated upon the optical detector.

3. The method of claim 2, wherein the ONS is disposed in a vehicle and the external light comprises sunlight.

4. The method of claim 2, wherein the second plurality of signals corresponds to both the external light and light reflected or scattered off a tracking surface, propagated upon the optical detector.

5. The method of claim 4, further comprising:
in response to the at least one of the first plurality of signals being less than the threshold value, reporting the second plurality of signals to derive motion data of the tracking surface.

6. The method of claim 1, further comprising:
comparing multiple signals of the first plurality of signals to the threshold value; and
in response to at least one of the multiple signals of the first plurality of signals being greater than the threshold value, suppressing reporting of the second plurality of optical signals.

7. The method of claim 1, further comprising:
deriving an average value based on the first plurality of signals;
comparing the average value to the threshold value; and
in response to the average value being greater than the threshold value, suppressing reporting of the second plurality of optical signals.

8. The method of claim 1, further comprising:
controlling, using the at least one processing element, a first time schedule of the disabling and enabling the light source, and a second time schedule of the receiving of the first and the second plurality of signals; and
synchronizing, using the at least one processing element, the first and the second time schedules whereby the first plurality of signals corresponds to a time period the light source is disabled and the second plurality of signals corresponds to a time period the light source is enabled.

9. The method of claim 8, further comprising:
incorporating a time delay period preceding the first time period to mitigate effects of a moving external light source on a fixed time schedule, wherein a duration of the time delay period is random.

10. The method of claim 1, wherein the periodicity of the sampling is littered based on random intervals.

11. The method of claim 1, wherein the comprises periodicity of the sampling is jittered based on pseudo-random intervals.

12. A method, comprising:
enabling and disabling a light source, using at least one processing element, in an optical navigation sensor (ONS);
using the at least one processing element, receiving a first plurality of PD signal samples from sampling by a photo-diode (PD) array in the ONS during a first time period corresponding to the light source being disabled and a second plurality of PD signal samples from sampling by the PD array during a second time period corresponding to the light source being enabled, wherein a periodicity of the sampling by the PD array is jittered;
comparing the first plurality of PD signal samples to at least one threshold value; and
in response to an outcome of the comparing the first plurality of PD signal samples to the at least one threshold value, adjusting, using the at least one processing element, at least one sensing parameter of the ONS, to mitigate effects of external light to the ONS on the second plurality of PD signal samples, wherein the first plurality of PD signal samples is collected before the second plurality of PD signal samples.

13. The method of claim 12, wherein the ONS is disposed within a vehicle as a part of an input system and the external light comprises sunlight.

14. The method of claim 12, wherein the sensing parameters comprise an output level of the light source, the timing schedule, and a size of the second plurality of PD signal samples being reported.

15. The method of claim 12, wherein the second plurality of PO signal samples comprises signals induced by both the external light and light reflected or scattered off a tracking surface, incident on the PD array.

16. The method of claim 14, further comprising:
in response to the first plurality of PD signal samples being less than the at least one threshold value, deriving motion data of the tracking surface from the second plurality of PD signal samples.

17. The method of claim 12, wherein the at least one threshold value is predetermined and stored in the at least one processing element and is programmable or adaptable according to the at least one sensing parameter of the ONS.

18. An input system disposed within a vehicle, the input system comprising:
an optical navigation sensor (ONS) and a top panel, wherein the ONS detects and tracks motion of a tracking surface placed onto the top panel, the ONS comprising:
a light source configured to illuminate the tracking surface, wherein output level of the light source is switched between a low level and a high level,
a photo-diode (PD) array configured to receive light incident thereon and generate PD signal samples based on periodically sampling the light received, wherein the light received comprises light reflected or scattered off the tracking surface and external light to the input system, wherein a periodicity of the sampling by the PD array is jittered, and
a processing element configured to:
control the output level switching of the light source based a timing schedule,
collect the PD signal samples from the PD array,
compare the PD signal samples, collected during a first period corresponding to the output level being at the low level, to a threshold value to determine if the external light exceeds a predetermined level,
in response to determining the external light does not exceed the predetermined level, report the PD signal samples collected during at least one subsequent period to the first period corresponding to the output level being at the high level, and
derive motion data of the tracking surface from the reported PD signal samples.

19. The input system of claim 18, wherein the light source, the photo-diode (PD) array and the processing element are formed in a single integrated circuit package; and
the PD array comprises a first plurality of photo-diodes and a second plurality of photo-diodes disposed adjacent to one another, wherein the PD signal samples generated by the first plurality of photo-diodes are collected in response to the light source being at the low level, and the PD signal samples generated by the second plurality of photo-diodes are collected in response to the light source being at the high level.

20. The input system of claim 18, further comprising:
a capacitive sense element, disposed onto the top panel of the input system and coupled to a capacitance sensor, wherein the capacitance sensor is configured to determine presence of the tracking surface on the top panel.

* * * * *